United States Patent
Miyamura et al.

(10) Patent No.: US 9,959,892 B1
(45) Date of Patent: May 1, 2018

(54) EXTENDING USABLE LIFE OF MAGNETIC STORAGE MEDIA

(71) Applicant: International Business Machines Corporation, Armonk, NY (US)

(72) Inventors: Tsuyoshi Miyamura, Yokohama (JP); Kazuhiro Tsuruta, Sagamihara (JP); Eiji Ogura, Yokohoma (JP); Tomoko Taketomi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/593,658

(22) Filed: May 12, 2017

(51) Int. Cl.
| G11B 21/02 | (2006.01) |
| G11B 5/588 | (2006.01) |
| G11B 5/592 | (2006.01) |
| G11B 15/473 | (2006.01) |
| G11B 5/008 | (2006.01) |
| G11B 15/18 | (2006.01) |
| G11B 5/584 | (2006.01) |

(52) U.S. Cl.
CPC .......... G11B 5/588 (2013.01); G11B 5/00813 (2013.01); G11B 5/584 (2013.01); G11B 5/5921 (2013.01); G11B 5/5922 (2013.01); G11B 15/1841 (2013.01); G11B 15/473 (2013.01)

(58) Field of Classification Search
None
See application file for complete search history.

(56) References Cited

U.S. PATENT DOCUMENTS

| 6,690,535 | B2 * | 2/2004 | Wang .................... G11B 5/584 360/25 |
| 8,982,493 | B2 | 3/2015 | Underkofler |
| 9,087,539 | B2 | 7/2015 | Argumedo et al. |
| 9,548,080 | B2 | 1/2017 | Bui et al. |
| 2006/0291101 | A1 | 12/2006 | Takaishi |
| 2008/0155304 | A1 * | 6/2008 | Chen .................. G06F 11/0727 714/2 |
| 2014/0063649 | A1 * | 3/2014 | Bui ........................ G11B 15/46 360/77.12 |
| 2014/0376126 | A1 * | 12/2014 | Underkofler ......... G11B 15/602 360/77.13 |

OTHER PUBLICATIONS

Kinney et al., "A Significant Improvement to Tape Drive PES by Canceling LTM with a Robust, High Performance controller", ©2008-2017 researchgate.net, 6 pages.

Miyamura et al. "Avoiding Debris Accumulation on Tape Drive", U.S. Appl. No. 15/425,062, filed Feb. 6, 2017, 33 pages.

"Servo Technology Enabling High Recording Density", Chapter 6, JEITA Tape Storage Experts Committee / Tape System Technical Document, English translation, printed on Apr. 21, 2017, 9 pages.

* cited by examiner

Primary Examiner — Tan X Dinh
(74) Attorney, Agent, or Firm — Steven F. McDaniel

(57) ABSTRACT

Some embodiments of the present invention logically eliminate an end region of a user-data area of a magnetic storage tape during formatting (or re-formatting) of the tape, if the position error signal (PES) variance corresponding to the end region exceeds a threshold. An adjacent region, having a PES variance less than the threshold is designated as a new end region, thereby shortening the user-data area of the tape and extending its usable life.

9 Claims, 10 Drawing Sheets

EXTENDING USABLE LIFE OF MAGNETIC STORAGE MEDIA

BACKGROUND OF THE INVENTION

The present invention relates generally to the field of magnetic data storage, and more specifically to extending the useful life of magnetic tape cartridges exhibiting certain wear characteristics.

Some conventional tape drives adopt a linear recording system (a recording scheme that defines data tracks extending in parallel with the tape direction of travel) where data is simultaneously written to 32 tracks using 32 respectively corresponding heads. Each track is divided into 160 wraps with the corresponding writing areas slightly offset from one another.

Accurate tracking performance of the magnetic heads is necessary for writing data quickly, accurately, and densely onto this narrow track. Minor sideways displacement of the traveling tape relative to the heads takes the heads out of position relative to the data track, which may lead to data errors. Two servo bands sandwich each data band to enable accurate positioning of the magnetic heads for writing and reading of the data, and the servo bands provide information for obtaining the tape speed and the position of the head in the vertical direction (that is, in the across-the-tape direction).

Fine-tuned control in the track-following direction (control for positioning the head accurately on the track) makes use of a position error signal (PES) as an input for the track-following control system. The PES is the difference between a reference value (YPOS-reference) and track-following position information called YPOS (Y-Position) obtained by reading servo patterns written on the tape medium.

SUMMARY

According to an aspect of the present invention, there is a method, computer program product and/or system that performs the following operations (not necessarily in the following order): (i) determining a deviation value corresponding to an end region of a plurality of regions of a tape, where the end region corresponds to a turnaround position of a tape drive head; (ii) determining that the deviation value of the end region exceeds a threshold; and (iii) in response to determining that the deviation value of the end region exceeds the threshold, eliminating the end region, from the plurality of regions. The deviation value may be a position error signal value.

DETAILED DESCRIPTION

A magnetic tape cartridge that has been in use for some time may be reformatted and re-used. The tape medium has servo bands that may be encoded onto the tape by the manufacturer. A read/write head assembly reads the servo bands to provide input to the head positioning control system which in turn guides the head to a target lateral position across the tape width. A position error signal (PES), is an instantaneous measure of the difference between the actual position of the head and the target position. PES sigma (sometimes herein referred to as PES variance) records how the PES signal varies over time. PES sigma may in time, become excessive due to degradation of the servo tracks encoded on the tape, causing read/write errors, and/or rendering a tape unusable. PES sigma tends to be greatest at the beginning and end regions of the user-data area of a tape.

In some embodiments of the present invention, if the PES variance exceeds a threshold, the end region is logically eliminated from the user-data area. An adjacent region, having a PES variance less than the threshold, is designated as a new end region, thereby extending the usable life of the tape. The user-data area is readable and writable.

The present invention will now be described in detail with reference to the Figures.

Figure 1:
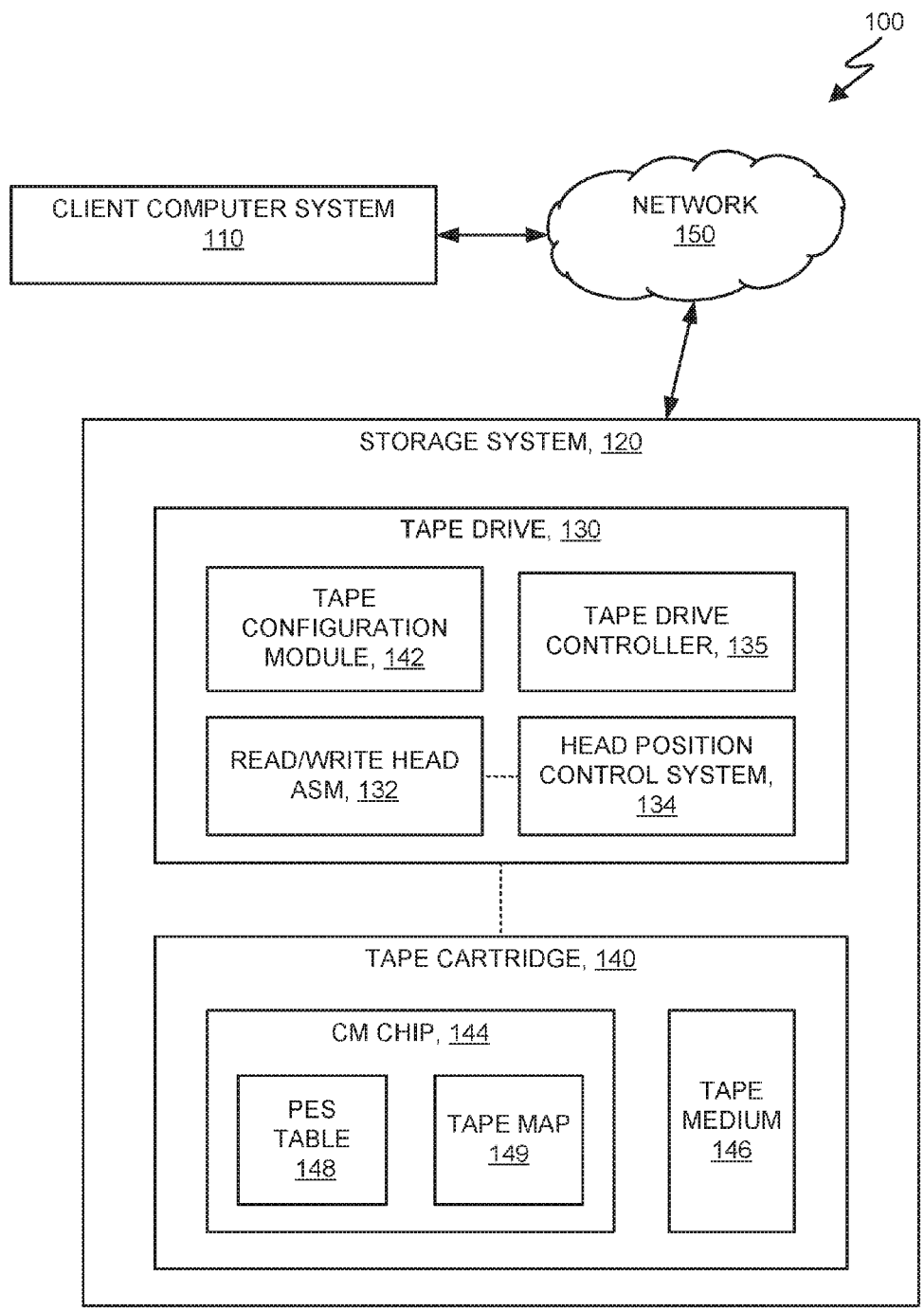
FIG. 1 is a functional block diagram depicting a computing environment in accordance with at least one embodiment of the present invention.

FIG. 1 is a functional block diagram depicting a computing environment 100 in accordance with an embodiment of the present invention. Computing environment 100 includes: client computer system 110; storage system 120; tape drive 130; read/write head assembly 132; head position control system 134; tape drive controller 135; tape cartridge 140; tape configuration module 142; cartridge memory chip 144; tape medium 146; PES table 148, tape map, 149; and network 150. Client computer system 110 can be any of a desktop computer, a laptop computer, a specialized computer server, or any other computer system known in the art. In some embodiments, client computer system 110 represents a computer system utilizing clustered computers and components to act as a single pool of seamless resources when accessed through network 150. In general, client computer system 110 is representative of any electronic device, or combination of electronic devices, capable of executing machine-readable program instructions, as described in greater detail with regard to FIG. 6. In some embodiments of the present invention, storage system 120 is in data communication with client computer system 110 through network 150. In other embodiments, storage system 120 and client computer system are in direct data communication (not communicating through network 150).

Figure 2:
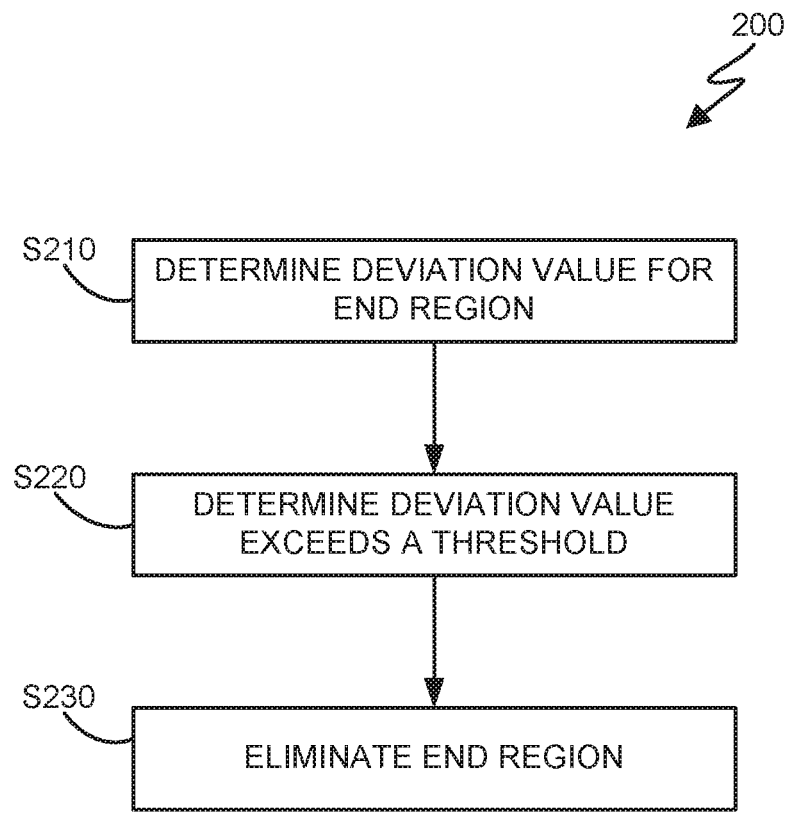
FIG. 2 is a re-configuration process flowchart in accordance with at least one embodiment of the present invention.

Flowchart 200 of FIG. 2 shows a tape re-configuration method in accordance with at least one embodiment of the present invention. Processing begins with operation S210, where the head position control system 134 of tape drive 130, of storage system 120 (see FIG. 1) determines a position error signal (PES) value at an end region of a tape, with reference to servo tracks encoded on the tape. The PES is the difference between a reference position and the actual position as determined by signals generated by the servo tracks. Head position control system 134 attempts to minimize the PES. Variance in the PES (called PES sigma) may grow larger over time as the tape wears and the signals generated by the servo tracks become progressively degraded (due to degradation of the servo patterns themselves).

Processing proceeds to operation S220 where head position control system 134 determines that PES sigma, at an end region of the tape, exceeds a threshold, meaning that variance in the value of PES is greater than a pre-determined threshold limit, thus risking loss or corruption of data due to unacceptable deviation in the position of the read/write head assembly relative to the data tracks on the tape.

Processing proceeds to operation S230, where in response to the end region PES sigma exceeding the threshold, tape configuration module 142 of tape drive 130 of storage system 120 (see FIG. 1) logically eliminates the end region (having the excessive PES sigma) from the user-data area of the tape and designates a new end region (having PES sigma that does not exceed the threshold), thereby defining a shortened user-data area of the tape having a new data capacity that may be less than the data capacity of the original user-data area.

Figure 3B:
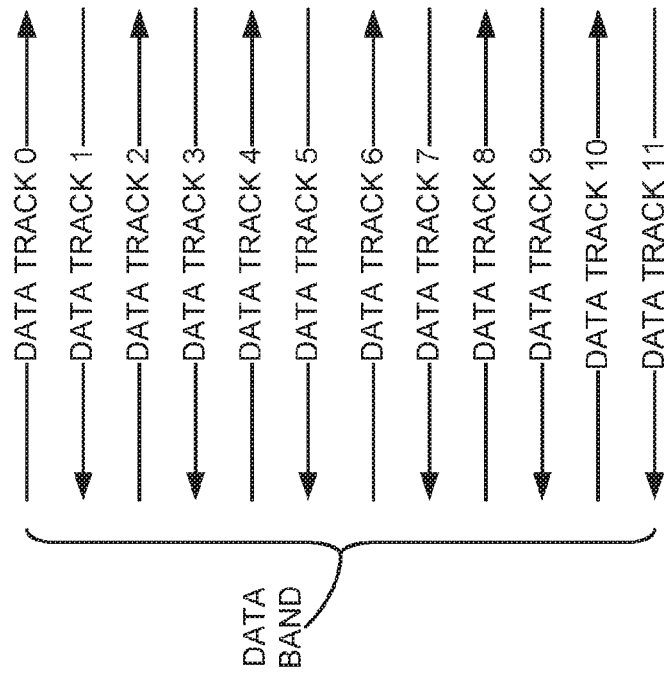
FIG. 3B is a schematic representation of a plurality of data tracks in a data band in accordance with at least one embodiment of the present invention.
Figure 3A:
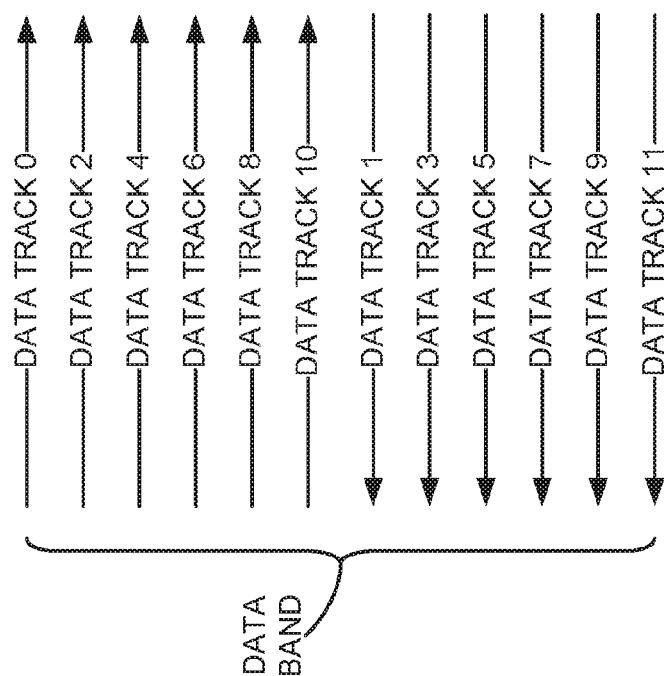
FIG. 3A is a schematic representation of a plurality of data tracks in a data band in accordance with at least one embodiment of the present invention.

Certain aspects of a tape format in some embodiments of the present invention will now be discussed with reference to FIGS. 3A, 3B and 3C. Data writing takes place starting within the user-data area of the tape, and progressing toward the EOT (End Of Tape), simultaneously for multiple tracks. This constitutes one forward path, which is a unit called a "wrap." The data track is depicted as a forward/backward (forward direction/reverse direction) path, and one data band has multiple wraps. For example FIG. 3A shows a track configuration of a single data band having 12 data tracks (data track 0 through data track 11) in an embodiment of the present invention. The read-write head traverses data tracks 0, 2, 4, 6, 8, and 10 in one pass moving (relative to the tape) in the forward direction (toward the end of the tape). The read/write head traverses data tracks 1, 3, 5, 7, 9, and 11 in the return pass of the head moving (relative to the tape) in the reverse direction (toward the beginning of the tape), to complete a wrap. FIG. 3B shows a track configuration of a single data band having 12 data tracks in an alternative embodiment.

Figure 3C:
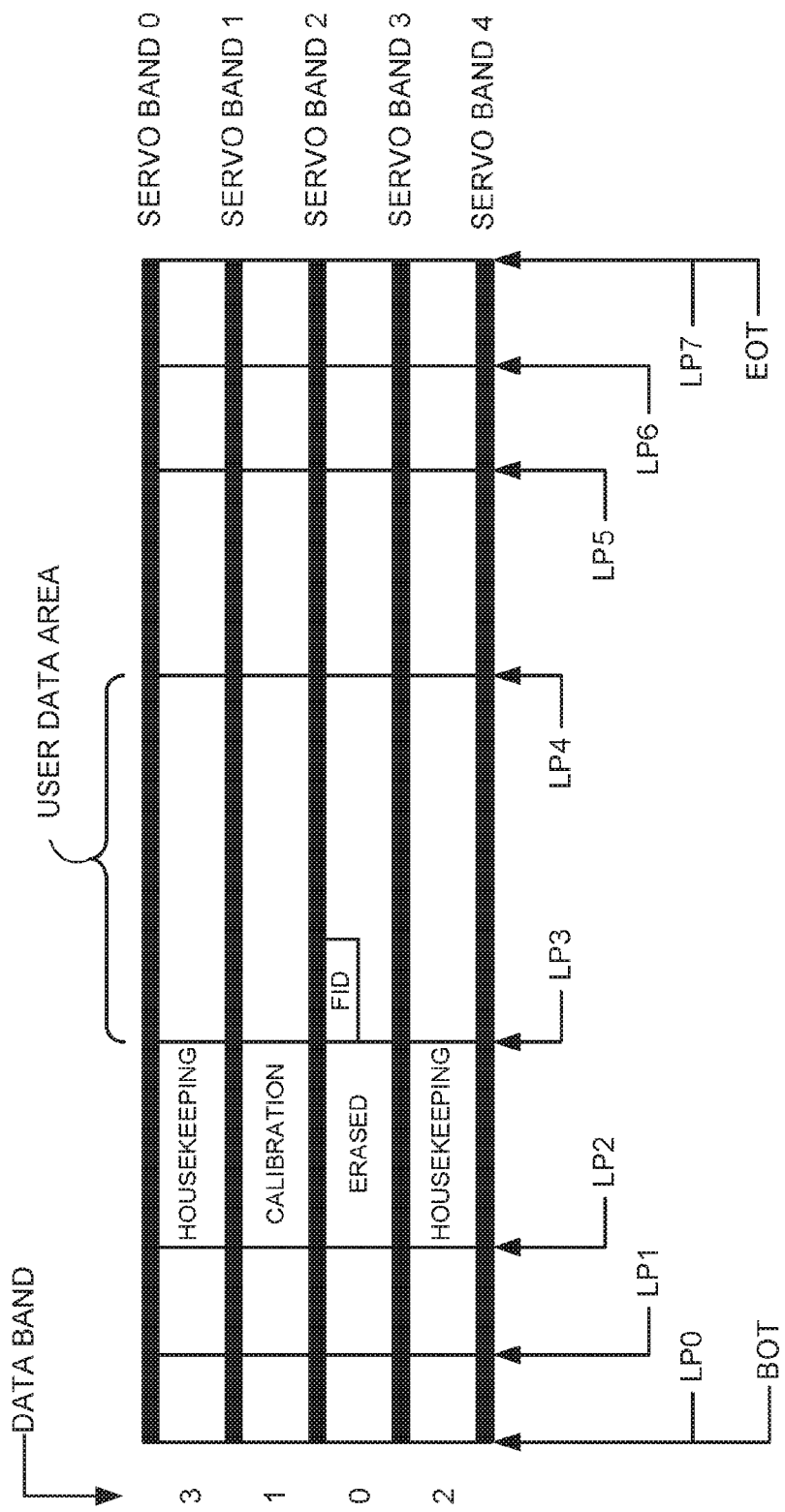
FIG. 3C is a schematic representation of a tape format configuration in accordance with at least one embodiment of the present invention.

FIG. 3C shows a tape format in accordance with some embodiments of the present invention. Four data bands (data band 0 through 3) and five servo bands (servo band 0 through servo band 4) are arranged across the width of a tape. In some embodiments of the present invention, the tape manufacturer writes the servo patterns in the servo bands. The five servo bands are arranged such that each data band lies between two servo bands as shown in the Figure. For example, as shown in the Figure, data band 0 lies between servo bands 2 and 3, while data band 3 lies between servo bands 0 and 1. Alternatively, some embodiments may have more or fewer data bands and servo bands and/or the arrangement thereof may be different.

In the embodiment of FIG. 3C, a tape is sectioned along its length into seven areas, respectively demarcated by eight logical points (LP0 through LP7). LP0 marks the beginning of the tape (BOT) which is the end at which the leader pin is attached. LP7 marks the end of the tape (EOT) which is attached to the cartridge tape reel.

The regions between the following pairs of logical points, in some embodiments, are not used: (i) LP0-LP1; (ii) LP5-LP6; and (iii) LP6-LP7. The region between LP1 and LP2 is used for servo recognition when the tape is moving in the forward direction. The region between LP2 and LP3 is used for various things such as housekeeping, calibration, and to mark a data band that has been erased, for example. The region between LP4 and LP5 is used for servo recognition when the tape is moving in the reverse direction.

The region between LP3 and LP4 is the user-data area of the tape. In some embodiments of the present invention, this region is made up of several smaller regions, for example 112 regions, as will be discussed below with reference to FIGS. 5A through 5F. Marker FID is a format identifier which provides information to head position control system 134 (see FIG. 1) with respect to the format of the tape.

In some embodiments of the present invention, read/write head assembly 132 has multiple individual read/write heads (transducers which write and/or read data respectively to and from the tape) and multiple servo heads (transducers which read from the servo tracks). These read/write transducers and servo transducers are all set and rigidly fixed within the read/write head assembly. Neither the read/write heads nor the servo heads are shown in the Figures.

When the tape reaches LP1 (that is when LP1 passes read/write head assembly 132, see FIG. 1), the servo head senses the servo track(s). Head position control system 134 (see FIG. 1) positions the read/write head assembly by reference to servo signals generated as the servo pattern in the servo band moves past the servo head.

When tape cartridge 140 is loaded into tape drive 130 (see FIG. 1), the tape drive continuously traces the servo band starting when LP1 passes the read/write head assembly. Head position control system 134, with reference to signals received from the servo head, positions read/write head assembly 132 relative the data tracks in the user-data area of the tape (that is, regions between LP3 and LP4).

Head position control system 134 (see FIG. 1) is finely-tuned for accurately positioning the read/write head assembly on the tracks in the direction across the width of the tape (sometimes referred to as the track-following direction). One input to the head position control system takes is the position error signal (PES). The PES is determined by subtracting a reference value (YPOS reference) from the track-following position information called YPOS (Y-Position) obtained from the servo patterns written on the tape. In other words, PES is proportional to the difference between the target position of the read/write head assembly and its actual position.

Some embodiments of the present invention use a variance value of the PES (sometimes herein referred to as "PES sigma") to record, log and evaluate deviations in the PES value while data is being read or written. A large PES sigma value indicates that the PES value is varying widely.

If the PES sigma value exceeds a certain threshold during a read or write operation, some embodiments of the present invention may recognize one, or more, of the following facts, potential problems and/or potential areas for improvement with respect to the current state of the art: (i) a read/write head may encroach on an adjacent track; (ii) data may be erroneously written to or erroneously read from the wrong track (for example accessing data track 5, when the target track is data track 4 (see FIG. 3B)); (iii) data read or written may become corrupted, or misplaced between tracks on the tape such that is it not reliably recoverable.

In case the PES sigma value exceeds the threshold, the track control (not shown in the Figures) immediately stops the reading/writing operation, rewinds the tape and restarts the read/write operation (a process sometimes referred to as a back-hitch).

Some embodiments of the present invention may further recognize one, or more, of the following facts, potential problems and/or potential areas for improvement with respect to the current state of the art: (i) signals from the servo pattern on a tape degrade as the tape is repeatedly used; (ii) it becomes difficult to accurately read the servo pattern due to this degradation; (iii) accurate positioning of the read/write head assembly may not be possible, no matter how many times the track control back-hitch is carried out; and/or (iv) if the PES variance exceeds a certain threshold, it becomes impossible to read and/or write data at the affected area of the tape. Traditionally, a tape having a degraded servo pattern and/or a PES sigma larger than a certain threshold needs to be disposed or discarded because it may no longer be considered usable.

PES sigma values tend to increase faster in regions near LP3 and LP4 (as compared to other regions within the user-data area of the tape). The higher wear rate near the ends of the user-data area is thought to be caused by the fact that wrap turns take place more frequently in those areas, causing more degradation due to friction with the head.

In some embodiments of the present invention, if a region has a PES sigma exceeding a certain threshold, (which indicates degradation in the servo pattern) tape drive controller 135 records the PES sigma data (at least) in PES table 148 of cartridge memory chip (CM chip 144), of tape cartridge 140, of storage system 120 (see FIG. 1). The excessive sigma value may have been stored at any time during the lifetime of the tape cartridge, such as during the times when the cartridge is used prior to being reformatted for re-use.

Several indicators may be used, alone or in combination, as criteria for determining what the threshold value should be. These indicators including the following: (i) PES sigma; (ii) error occurrence status (types of errors encountered, frequency of such errors, numbers of corrective actions attempted to correct the errors, etc.); and/or (iii) number of back-hitches performed due to large PES, etc.

Some embodiments of the present invention eliminate an area from the user-data area of a tape concurrent with (during) formatting of the tape if: (i) information in PES table 148 indicates that a region, or contiguous series of regions, (the "bad" area) of the tape has PES sigma(s) exceeding a threshold; and (ii) a region, contiguous with the "bad" area, has a PES sigma not exceeding the threshold, then tape configuration module 142 of tape drive 130 (see FIG. 1) modifies the user-data area of the tape to logically eliminate the "bad" area (the regions within the "bad" area) from the user-data area. The tape configuration module does this by writing a new logical LP3 and/or new logical LP4 position. This "reassignment" of LP3 and/or LP4 is discussed in greater detail below with respect to FIGS. 5A through 5F. Note that the "bad" area is not physically removed from the tape, but it is no longer included as part of the user-data area. Such a tape may not need to be discarded and it may be possible to continue using it, thereby extending the useful lifetime of the tape.

Figure 4A:
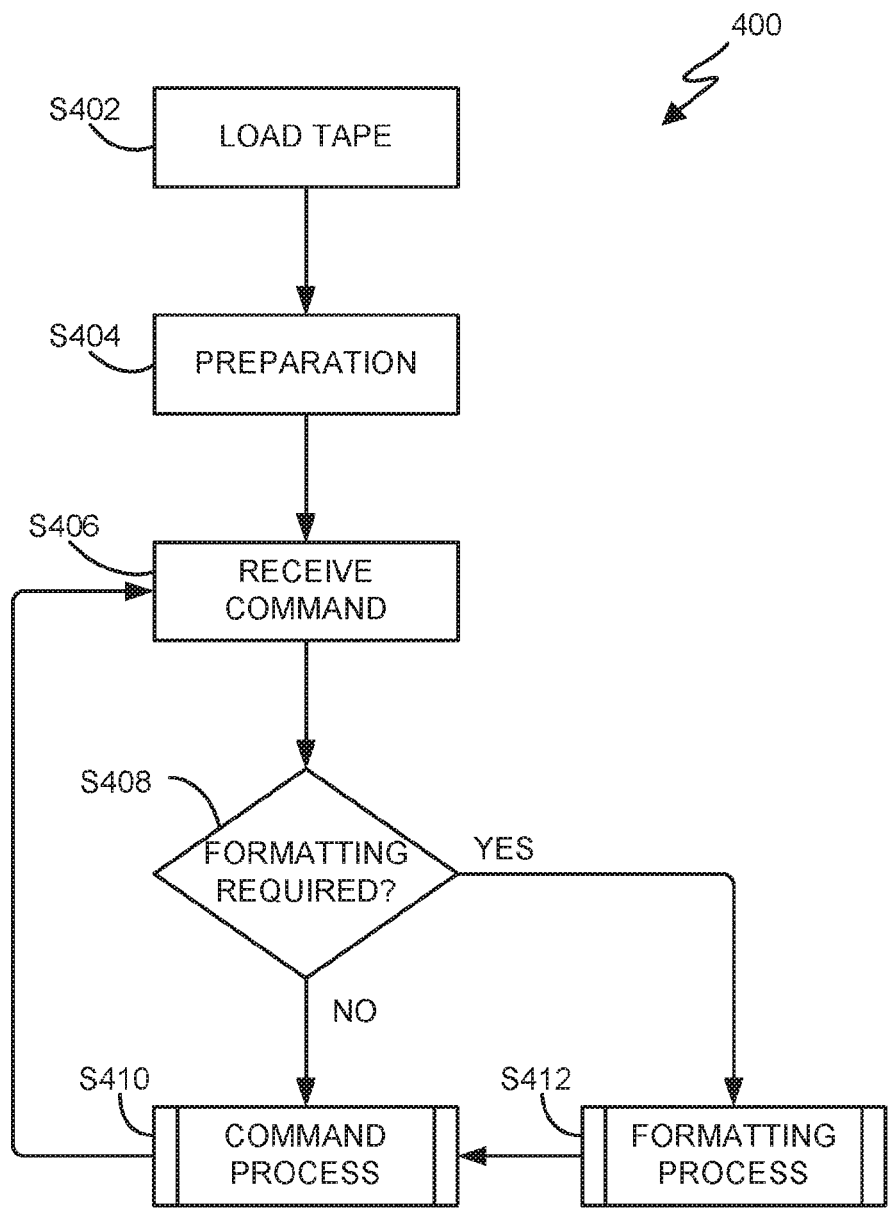
FIG. 4A is a tape operating process flowchart in accordance with at least one embodiment of the present invention.

Operations in accordance with some embodiments of the present invention will now be discussed with reference to process flowchart 400 of FIG. 4A. Processing begins with operation S402, where a loader (or a user) loads a tape cartridge into a tape drive.

Processing proceeds to operation S404, where tape configuration module 142 of tape drive 130 (see FIG. 1) carries out preparatory actions including the following actions (A, B, and C):

(A) Tape configuration module 142 reserves an area in the cartridge memory chip (CM chip 144 of tape cartridge 140, see FIG. 1) for information pertaining to regions of the user-data area of the tape (for example 112 regions as will be discussed below with reference to FIGS. 5A through 5F). The CM chip is non-volatile memory incorporated in a tape cartridge. The CM chip is in data communication with tape configuration module 142 of tape drive 130. Information stored on the CM chip includes the PES sigma values associated with regions of the user-data area of the tape as well as information pertaining to: (i) the original logical points LP3 and LP4 (respectively physical LP3 and physical LP4); and (ii) newly specified logical points LP3 and LP4 (logical LP3 and logical LP4).

The CM chip is one example location where the PES sigma values for each region (PES table 148) may be stored. In some embodiments of the present invention, the PES table is stored on any non-volatile storage available on the cartridge, such as embedded on the tape medium. For example, the area between LP2 and LP3, where certain kinds of housekeeping data are stored, can also be utilized to store the PES table.

(B) Tape configuration module 142 initializes PES sigma values, stored in PES table 148 on the CM chip, to 0 (zero) when initializing the cartridge.

(C) Thresholds for the PES sigma values (respectively corresponding to the regions within the user-data area of the tape) are specified in advance for each drive and each tape. Position control of the read/write head assembly becomes increasingly difficult if a PES sigma value approaches or exceeds the threshold.

Processing proceeds to operation S406 where tape drive controller 135 receives a command. The command may be directed to, for example, reading data from the tape, writing data to the tape, formatting the tape, ejecting the tape cartridge from the drive, etc.

Processing proceeds to decision S408. If formatting of the tape is not required (S408, "No" branch) processing proceeds to operation S410 where tape drive controller 135 (see FIG. 1) carries out the command received in operation S406, after which processing proceeds back to operation S406. If formatting of the tape is required (S408, "Yes" branch), processing proceeds to operation S412, after which processing proceeds to operation S410 and subsequently back to operation S406.

Figure 4B:
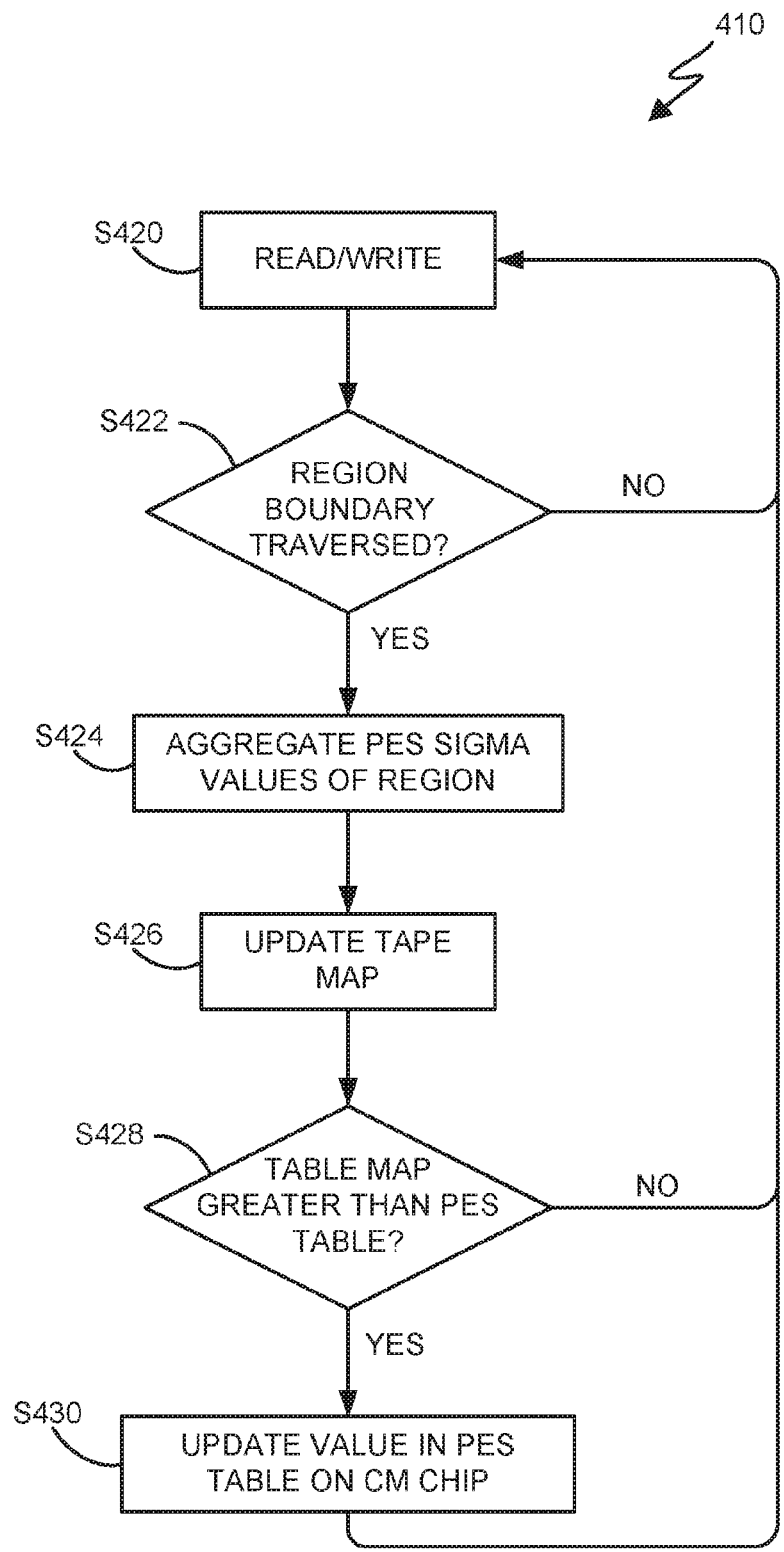
FIG. 4B is a command process flowchart in accordance with at least one embodiment of the present invention.

Operations carried out with respect to operation S410 will be discussed below with respect to command process flowchart 410 of FIG. 4B. Operations carried out with respect to operation S412 will be discussed further below with respect to formatting process flowchart 412 of FIG. 4C.

The command process of operation S410, of process flowchart 400 of FIG. 4A, will now be discussed with reference to command process flowchart 410 of FIG. 4B. Processing begins with operation S420 where tape drive controller 135 (see FIG. 1) conducts a read or write operation. If the read/write operation does not traverse a region boundary (S422, "No" branch), processing proceeds at operation S420, where the read/write operation continues normally. If the read/write operation traverses a region boundary (S422, "Yes" branch), meaning the read or write operation has crossed from a previous region to a next one, processing proceeds with operation S424 where tape configuration module 142 (see FIG. 1) aggregates the PES sigma values of the wraps within the previous region and determines a maximum PES sigma value observed within the previous region during the read or write operation.

Processing proceeds to operation S426, where tape configuration module 142 writes the maximum PES sigma value observed in operation S424, to tape map 149 of CM chip 144 of tape cartridge 140 (see FIG. 1). In some embodiments of the present invention, the tape map is a temporary data area on the CM chip.

Processing proceeds to decision S428, where tape configuration module 142 (see FIG. 1) compares the PES sigma value in the tape map corresponding to the previous region, to the PES sigma value in the PES table. If the PES sigma value in the tape map is not larger than the PES sigma value in the PES table for the corresponding region (S428, "No" branch), processing proceeds at operation S420 where the read/write operation continues normally. If the PES sigma value in the tape map is larger than a PES sigma value for the corresponding region in the PES table (S428, "Yes" branch), processing proceeds at operation S430, where tape configuration module 142 replaces the PES sigma value stored in the PES table with the PES sigma value stored in the tape map. In other words, a PES sigma value stored in the PES table of the CM chip represents the greatest PES sigma value recorded for the corresponding region of the tape.

The formatting process of operation S412, of process flowchart 400 of FIG. 4A, will now be discussed. Note that the formatting process is sometimes herein referred to as the reformatting process. The terms "formatting" and "reformatting" may herein be used interchangeably. In some embodiments of the present invention, when new data is written to a tape starting from the beginning of the tape, the data that were written to the tape prior to the writing of the new data becomes invalid and the tape is reformatted into a new format. Data can be written to a tape cartridge, in some embodiments, with different formats, depending on the generations of the tape drive. For example, in some embodiments of the present invention, a tape that is divided into 80 wraps in its initial format, may be reformatted and divided into 144 wraps, increasing the capacity of the tape from four terabytes (in the initial format) to seven terabytes (when reformatted and divided into 144 wraps). In some embodiments of the present invention, reformatting allows for changing the number of wraps and the like in accordance with the format that allows the largest capacity supported by the specific drive for the specific tape when data is written to the tape starting from the beginning of the tape.

In some embodiments of the present invention, data on a tape may become invalid by dividing the tape into partitions, or by changing the storage capacity of the tape, and thus the same effect as that of reformatting can be obtained. The same further applies to a case where data is written to a tape (starting from the beginning of the tape) that is not divided into partitions.

Figure 4C:
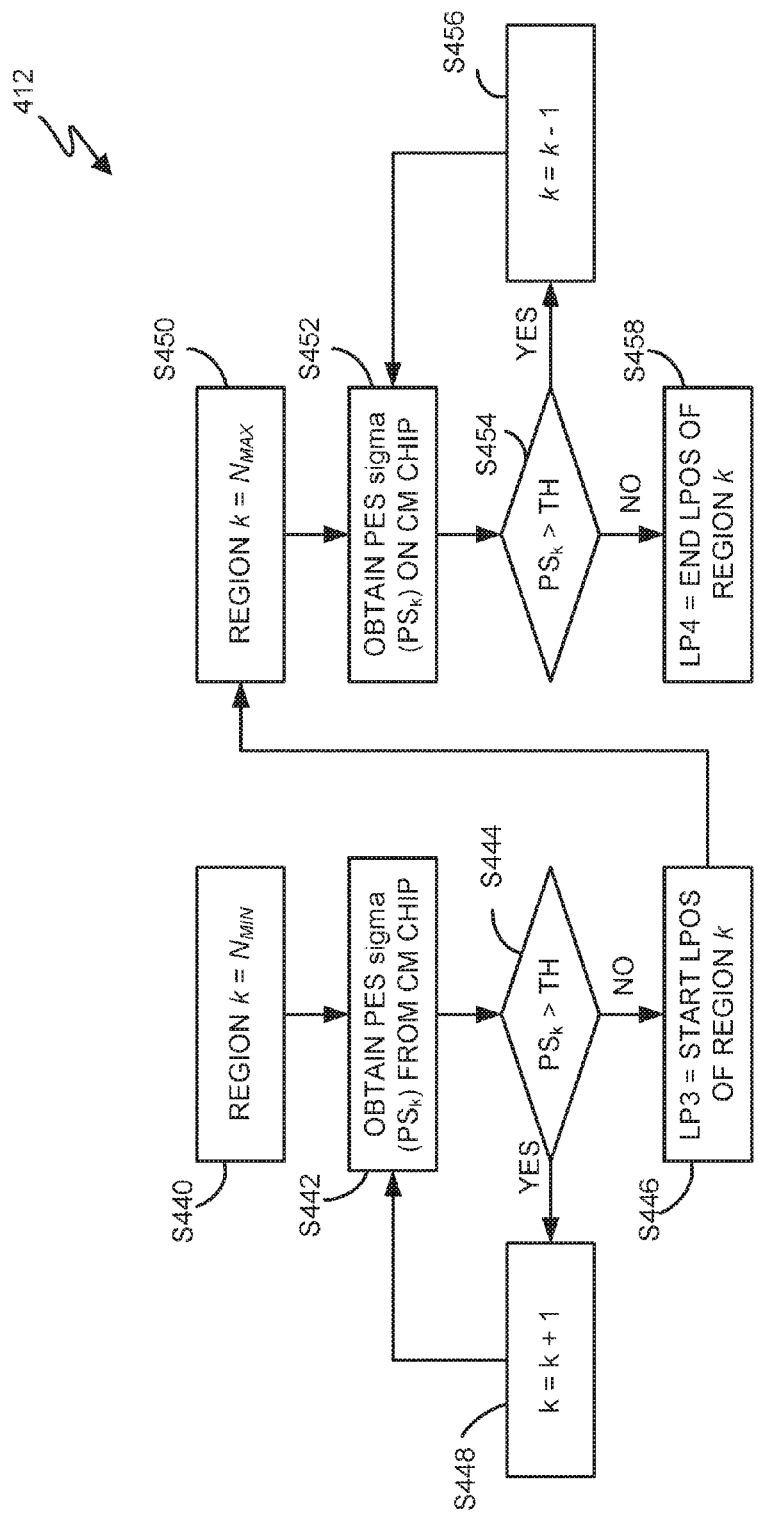
FIG. 4C is a formatting process flowchart in accordance with at least one embodiment of the present invention.

With reference now to formatting process flowchart 412 of FIG. 4C, each region of the user-data area of the tape, is represented with a counter, k, where k is an integer between $N_{MIN}$ and $N_{MAX}$ inclusive. The beginning of the user-data area ($k=N_{MIN}$) is demarcated by LP3, and the end of the user-data area ($k=N_{MAX}$) is demarcated by LP4 (see FIG. 3C). Note: further discussion with respect to configuration of the user-data area of the tape is discussed below with respect to FIGS. 5A through 5F.

Processing begins at operation S440 where a counter, k, is set to $N_{MIN}$, to begin processing of the beginning of the user-data area of the tape. Tape configuration module 142 (see FIG. 1) obtains (S442) the PES sigma value ($PS_k$) stored in PES table 148 of CM chip 144 (see FIG. 1).

Processing proceeds at decision S444, where tape configuration module 142 compares $PS_k$ against the threshold value (TH). TH represents a tolerable limit for $PS_k$. If $PS_k$ is greater than TH (S444 "Yes" branch), processing proceeds at operation S448 where k is incremented (k=k+1). Processing proceeds again at operation S442 where processing, in similar fashion, begins for the next region working towards the end of the tape. If $PS_k$ is not greater than TH (S444, "No" branch), processing proceeds at operation S446 where tape configuration module 142 sets LP3 equal to the starting logical position (LPOS) of region k, thereby designating region k as the new logical starting region (sometimes herein referred to as the new beginning region) of the user-data area of the tape. Thus regions closer to the beginning of the tape than region k, are logically excluded from the user-data area.

Processing proceeds at operation S450, where counter k is set to $N_{MAX}$, to begin processing of the end of the user-data area of the tape. Tape configuration module 142 (see FIG. 1), obtains (S452) the PES sigma value ($PS_k$) stored in PES table 148 of CM chip 144 (see FIG. 1).

Processing proceeds at decision S454, where the tape configuration module compares $PS_k$ against the threshold value (TH). If $PS_k$ is greater than TH (S454, "Yes" branch), processing proceeds at operation S456 where k is decremented (k=k−1). Processing proceeds again at operation S452 where processing, in similar fashion, begins for the next region working towards the beginning of the tape. If $PS_k$ is not greater than TH (S454, "No" branch), processing proceeds to operation S458 where tape configuration module 142 sets LP4 equal to the ending logical position (LPOS) of region k, thereby designating region k as the new logical ending region of the user-data area of the tape. Thus regions closer to the end of the tape than region k, are logically excluded from the user-data area.

An illustrative example using fictitious numbers will now be discussed with reference to FIG. 4C. Assume a tape has 112 regions in the user-data area. The regions are numbered 0 through 111. $N_{MIN}$ is 0 and $N_{MAX}$ is 111. Assume values stored in PES table 148 on CM chip 144 (see FIG. 1) are as follows: $PS_0$=120; $PS_1$=110; $PS_2$=100; $PS_{110}$=98; $PS_{111}$=115; and TH=105. (Start with $k=N_{MIN}$): k=0 (S440). At S444, we find that $PS_0$ is greater than TH (120>105). Increment k=0+1=1 (S448). Again at S444, we find that $PS_1$ is greater than TH (110>105). Increment k=1+1=2 (S448). Yet again at S444, we now find that $PS_2$ is not greater than TH (105<110). Set LP3 to the starting logical position (start LPOS) of region 2 (S446). (Set $k=N_{MAX}$): k=111 (S450). At S454, we find that $PS_{111}$ is greater than TH (115>105). Decrement k=111−1=110 (S456). Again at S454, we now find that $PS_{110}$ is not greater than TH (98<105). Set LP4 to the ending logical position (end LPOS) of region 110 (S458). Thus the new user-data area of the tape extends from region 2 through region 110, inclusive. Regions 0, 1, and 111 are now excluded from the user-data area.

Figure 5A:
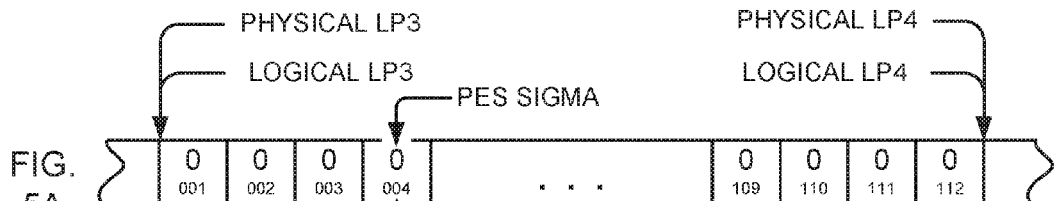
FIG. 5A is a schematic representation of a user-data area portion of a tape in accordance with at least one embodiment of the present invention.

An illustrative example embodiment will now be discussed with reference to FIGS. 5A through 5F. In this embodiment, the user-data area of a tape is divided into 112 regions, designated as regions 001 through 112. With regard to logical points LP3 and LP4, the original LP3 (also called the physical LP3) marks the starting position of region 1. The original LP4 (also called the physical LP4) marks the end position of region 112. Initially, logical LP3 and logical LP4 are respectively coincident with physical LP3 and physical LP4 as shown in FIG. 5A.

PES sigma values corresponding to the 112 regions, as stored in PES table 148 of CM chip 144 (see FIG. 1), are initialized to 0 (zero). These initial PES sigma values (all initial values=0) are represented in FIG. 5A in their respective regions, and as shown below in PES Table 1. In some embodiments of the present invention, the initial PES sigma values are stored the first time the tape is formatted after manufacture of the cartridge. Alternatively, in some embodiments, the initial PES sigma values may be stored at the time the CM chip is manufactured, when the CM chip is assembled to the tape cartridge, during testing of the tape cartridge during manufacture, etc.

TABLE 1

| PES | |
|---|---|
| Region | PES sigma |
| 001 | 0 |
| 002 | 0 |
| 003 | 0 |
| 004 | 0 |
| ... | ... |
| 109 | 0 |
| 110 | |
| 111 | 0 |
| 112 | 0 |

Figure 5B:
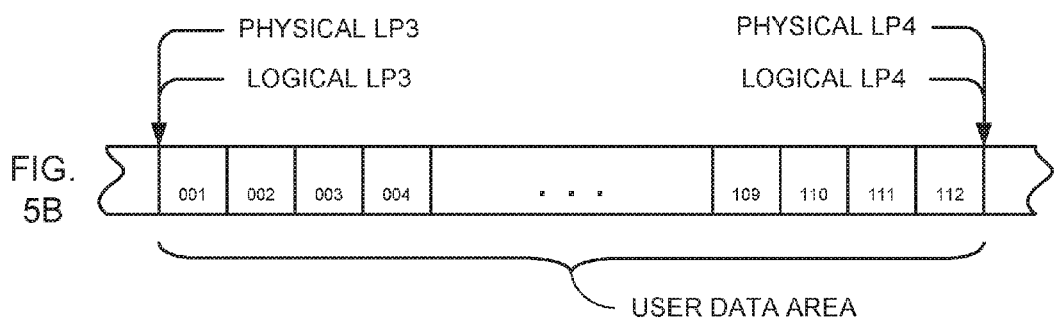
FIG. 5B is a schematic representation of a user-data area portion of a tape in accordance with at least one embodiment of the present invention.

The user-data area of the tape extends from logical LP3 to logical LP4, and includes regions 001 through region 112 inclusive, as shown in FIG. 5B.

Figure 5C:
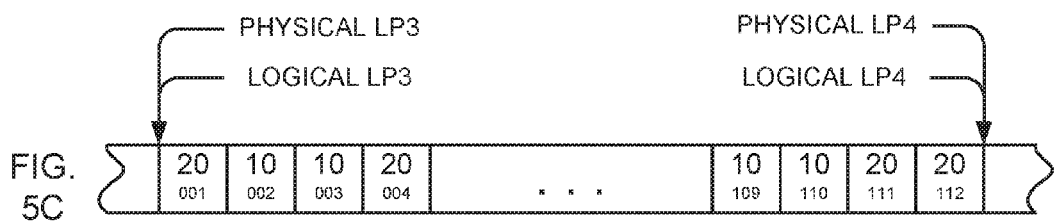
FIG. 5C is a schematic representation of a user-data area portion of a tape in accordance with at least one embodiment of the present invention.

Referring now to FIG. 5C, tape configuration module 142 updates PES sigma values stored in PES table 148 of CM chip 144 of tape cartridge 140 (see FIG. 1) according to values observed corresponding to individual regions, when the tape is in use. A process for updating the PES sigma values stored in the PES table, in some embodiments of the present invention, is described above with respect to control process flowchart 410 of FIG. 4B.

Concurrent with some period of usage of the tape cartridge, new PES sigma values are acquired. In the current example, these values are shown in FIG. 5C and below in PES Table 2.

TABLE 2

| PES | |
|---|---|
| Region | PES sigma |
| 001 | 20 |
| 002 | 10 |
| 003 | 10 |
| 004 | 20 |
| ... | ... |

TABLE 2-continued

| PES | |
|---|---|
| Region | PES sigma |
| 109 | 10 |
| 110 | 10 |
| 111 | 20 |
| 112 | 20 |

As time passes and the tape is used further, the servo tracks may deteriorate (as evidenced by increasing variance in the position error signal, especially at the beginning and ending regions of the user-data area of the tape). For any given region, tape configuration module 142 updates the PES sigma value in the CM chip when a currently observed PES sigma value is greater than the PES sigma value recorded in the CM chip. Thus, a PES sigma value recorded in the CM chip represents a "high water mark" with respect to the corresponding region on the tape.

Figure 5D:
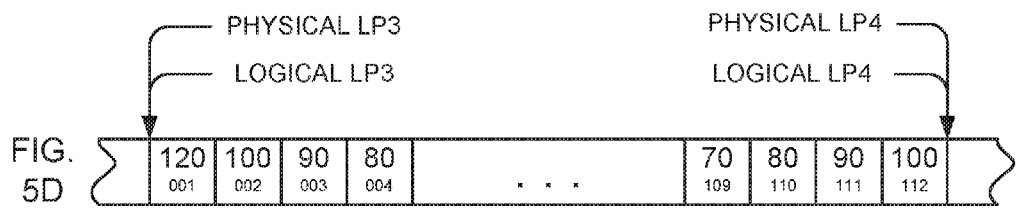
FIG. 5D is a schematic representation of a user-data area portion of a tape in accordance with at least one embodiment of the present invention.

After further usage of the tape cartridge in this illustrative example embodiment, the PES sigma values have increased, as shown in FIG. 5D and below in PES table 3.

TABLE 3

| PES | |
|---|---|
| Region | PES sigma |
| 001 | 120 |
| 002 | 100 |
| 003 | 90 |
| 004 | 80 |
| ... | ... |
| 109 | 70 |
| 110 | 80 |
| 111 | 90 |
| 112 | 100 |

In this state, PES errors begin to occur near LP3 and LP4, making it difficult to read and write data near LP3 and LP4. A threshold PES sigma value (sometimes referred to as a critical point) is set at 100 in this example embodiment, based on the respective PES sigma values and the occurrence of errors in regions 001, 002 and 112.

A threshold PES sigma value may be calculated by various methods and based on various attributes. In some embodiments of the present invention, the threshold PES sigma value is based on an integration of the instantaneous PES sigma values integrated over a time interval, such as during traversal of the read/write head over a given region of the tape. The threshold may be based on a frequency distribution of PES sigma values collected over a chosen portion of the user-data area of a tape. For example, a frequency distribution of the PES sigma values may provide a basis for choosing a threshold based on a number of standard deviations above the mean. Predictions as to the probability of unacceptable levels of tracking errors at the beginning and ending regions of the user-data area of the tape, may be based on observed PES sigma values of the end regions relative to the PES sigma values of other regions of the tape.

Figure 5E:
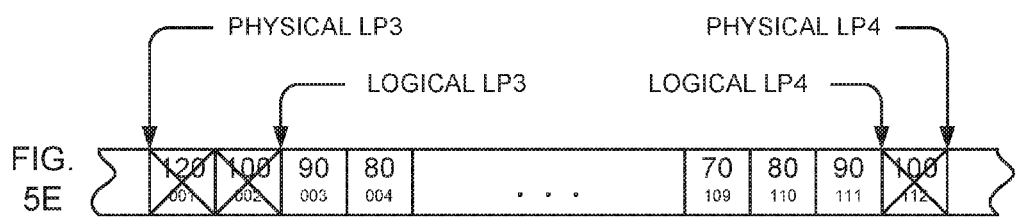
FIG. 5E is a schematic representation of a re-configured user-data area portion of a tape in accordance with at least one embodiment of the present invention.
Figure 5F:
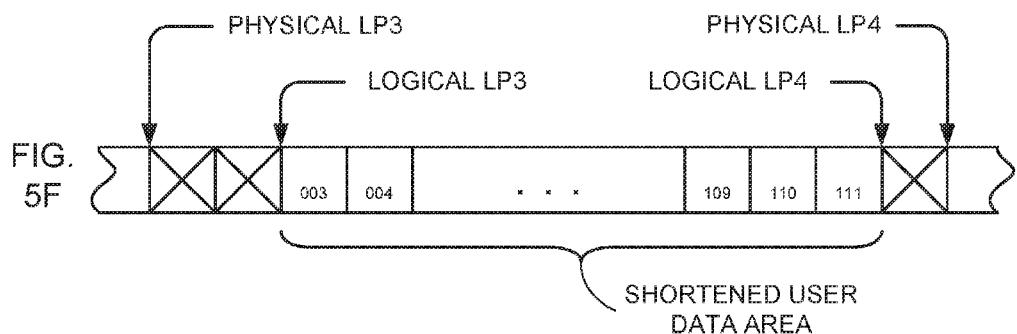
FIG. 5F is a schematic representation of a re-configured user-data area portion of a tape in accordance with at least one embodiment of the present invention.

As shown in FIGS. 5E and 5F, tape configuration module 142 (see FIG. 1) reconfigures the tape by setting logical LP3 to the start LPOS of region 3 and setting logical LP4 to the end LPOS of region 111 (see S446 and S458 of FIG. 4C). Regions 001, 002 and 112 all have PSE sigma values equal to or exceeding the threshold value of 100 and are therefore excluded from the user-data area. A shortened user-data area now includes the remaining regions (003 through 111) after logical exclusion of regions 001, 002 and 112.

It should be noted that the length of the interval between the logical LP3 and the logical LP4 is shorter than between the physical LP3 and the physical LP4, so that the storage capacity of the tape is decreased as well. However in some embodiments of the present invention, a tape is designed and configured to have a capacity margin on the order of 7%. That is, the nominal (stated) capacity may be approximately 7% less than the actual capacity. For example, a tape stated to have a capacity of 10-terabytes, that has 112 regions, may have an actual capacity of up to 10.7 terabytes. Accordingly, the user-data area can be shortened by up to seven regions which corresponds roughly to 7% of the 112 regions. Further, if a tape continues in service with compromised tape capacity (that is an actual capacity less than the nominal capacity), changing to a shorter writing length may be permitted, in some embodiments, by a user specifying in advance, on a configuration page (such as a mode page in some embodiments), the shortened length (and/or decreased capacity). The maximum writing capacity can be obtained or confirmed by the calling up the configuration page (such as a log page in some embodiments).

Some embodiments of the present invention may include one, or more, of the following features, characteristics and/or advantages: (i) records a deviation value for each region of a plurality of regions of a tape; (ii) selects, from the plurality of regions, an end region as a turnaround position of the tape drive head; (iii) determines whether a deviation value of the end region exceeds a threshold; (iv) in response to determining the deviation value of the end region exceeds the threshold, eliminating the end region to shorten a length of the plurality of regions; (v) the deviation value is a position error signal (PES) value; (vi) sets a new end region having a deviation value not exceeding the threshold, the new end region being adjacent the eliminated end region; (vii) the plurality of regions correspond to a user-data area of the tape, the user-data area being readable and writable by the tape drive head; (viii) in response to eliminating the end region from the plurality of regions, sets a new user-data area consisting regions not exceeding the threshold; (ix) the end region locates nearby a beginning position of the user-data area or an ending position of the user-data area; (x) notifies a user of a data capacity of the tape after eliminating the end region; (xi) in response to formatting the tape, determines whether the deviation value of the end region exceeds the threshold; and (xii) the deviation value for each region is recorded each time the tape drive head passes the region.

Figure 6:
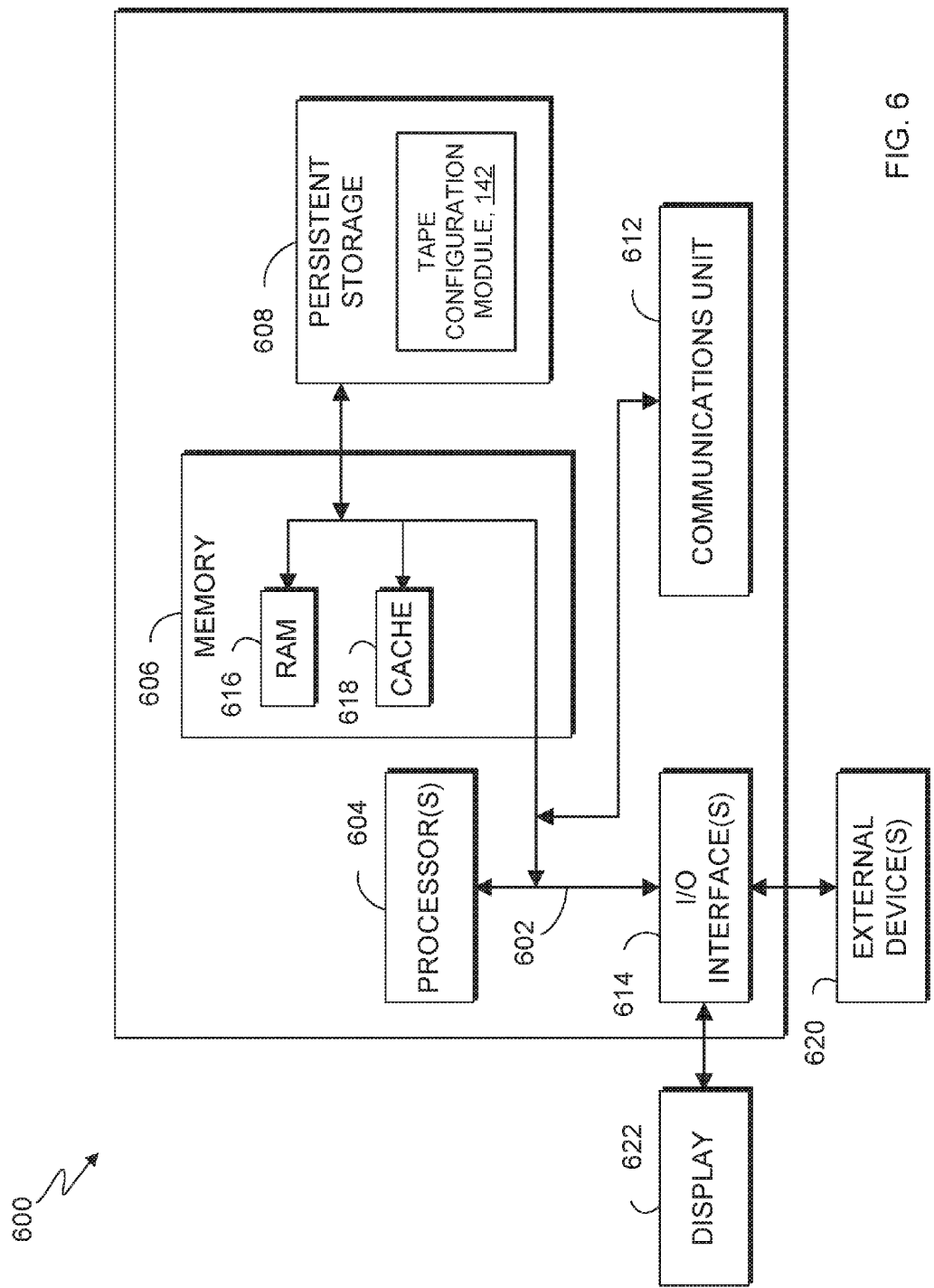
FIG. 6 is a block diagram depicting components of a computer, in accordance with at least one embodiment of the present invention.

FIG. 6 depicts a block diagram of components of computer 600 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

One or more programs may be stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 614. I/O interface(s) 614 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

Some embodiments may not have the potential advantages discussed throughout this disclosure, and the potential advantages are not necessarily required of all embodiments.

What is claimed is:

1. A method comprising:
    determining a deviation value corresponding to an end region of a plurality of regions of a tape, where the end region corresponds to a turnaround position of a tape drive head;
    determining that the deviation value of the end region exceeds a threshold;
    in response to determining that the deviation value of the end region exceeds the threshold, eliminating the end region, from the plurality of regions;
    designating a new end region having a deviation value that does not exceed the threshold, where the new end region is adjacent to the eliminated end region;
    creating a shortened user-data area based, at least in part, on the new end region; and
    notifying a user of a new data capacity of the tape based on the shortened user-data area;
    wherein:
        the shortened user-data area comprises regions, of the plurality of regions, for which a respectively corresponding plurality of deviation values do not exceed the threshold; and
        the new end region comprises one of: (i) a beginning region of the shortened user-data area; or (ii) an ending region of the shortened user-data area.

2. The method of claim 1, wherein the deviation value is a position error signal (PES) value.

3. The method of claim 1, wherein the plurality of regions comprise a user-data area of the tape, the user-data area being readable and writable by the tape drive head.

4. The method of claim 1, wherein recording the deviation value for the end region of the plurality of regions is performed concurrent with formatting of the tape.

5. A computer program product comprising:
    one or more non-transitory computer readable storage media and program instructions stored on the one or more non-transitory computer readable storage media, the program instructions comprising instructions to perform:
        determining a deviation value corresponding to an end region of a plurality of regions of a tape, where the end region corresponds to a turnaround position of a tape drive head,
        determining that the deviation value of the end region exceeds a threshold,
        in response to determining that the deviation value of the end region exceeds the threshold, eliminating the end region, from the plurality of regions,
        designating a new end region having a deviation value that does not exceed the threshold where the new end region is adjacent to the eliminated end region,
        creating a shortened user-data area based, at least in part, on the new end region, and
        notifying a user of a new data capacity of the tape based on the shortened user-data area;
    wherein:
        the shortened user-data area comprises regions, of the plurality of regions, for which respectively corresponding plurality of deviation values do not exceed the threshold, and
        the new end region comprises one of: (i) a beginning region of the shortened user-data area, or (ii) an ending region of the shortened user-data area.

6. The computer program product of claim 5, wherein the deviation value is a position error signal (PES) value.

7. The computer program product of claim 5, wherein the plurality of regions comprise a user-data area of the tape, the user-data area being readable and writable by the tape drive head.

8. The computer program product of claim 5, wherein recording the deviation value for the end region of the plurality of regions is performed concurrent with formatting of the tape.

9. A computer system comprising:
    one or more computer processors;
    one or more non-transitory computer-readable storage media;
    program instructions stored on the non-transitory computer-readable storage media for execution by at least one of the one or more processors, the program instructions comprising instructions to perform:
        determining a deviation value corresponding to an end region of a plurality of regions of a tape, where the end region corresponds to a turnaround position of a tape drive head,
        determining that the deviation value of the end region exceeds a threshold, and
        in response to determining that the deviation value of the end region exceeds the threshold, eliminating the end region, from the plurality of regions,
        designating a new end region having a deviation value that does not exceed the threshold, where the new end region is adjacent to the eliminated end region,
        creating a shortened user-data area based, at least in part, on the new end region, and
        notifying a user of a new data capacity of the tape based on the shortened user-data area,
    wherein the new end region comprises one of: (i) a beginning region of the shortened user-data area; or (ii) an ending region of the shortened user-data area.

* * * * *